March 11, 1941.  H. WOLLNER  2,234,296
CONSTANT VELOCITY UNIVERSAL JOINT
Filed July 1, 1937  3 Sheets-Sheet 3
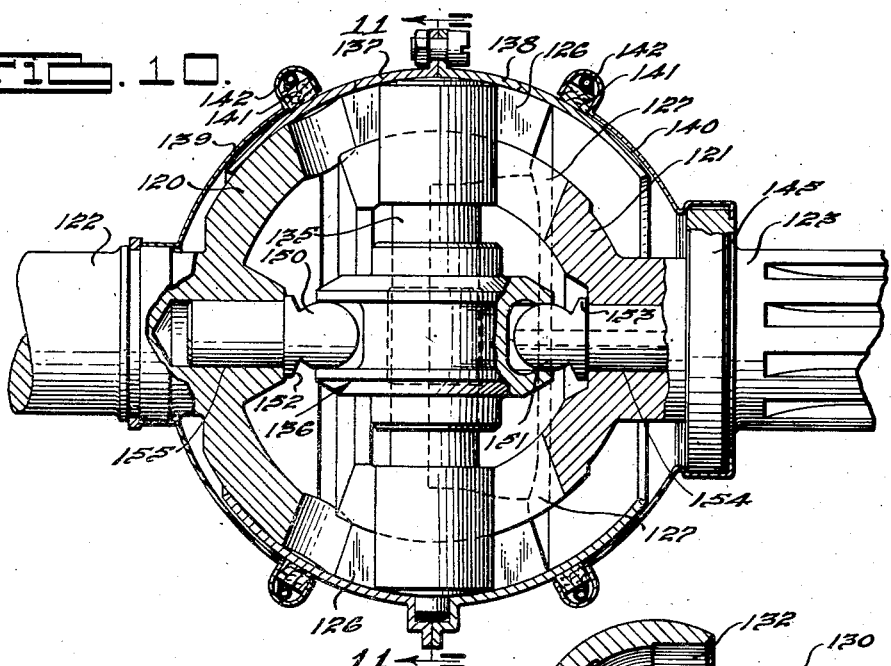
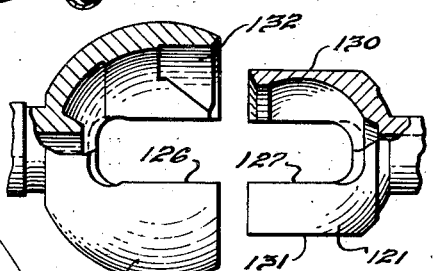
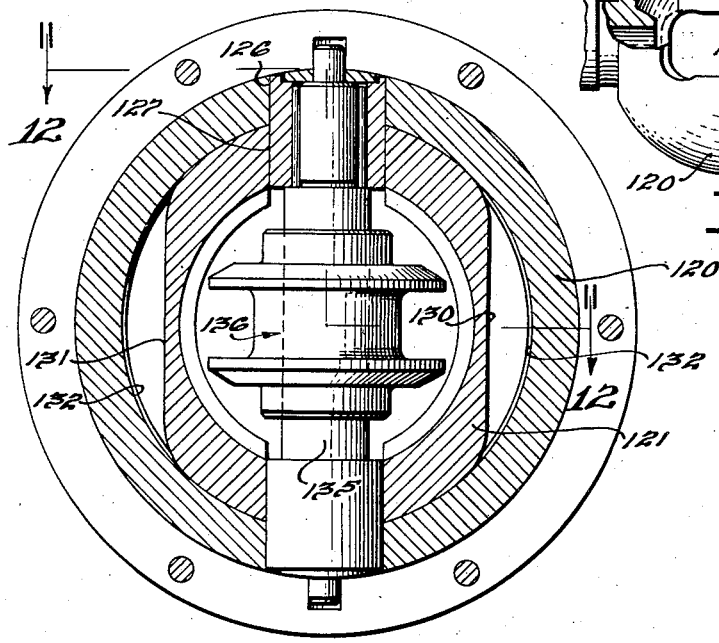
INVENTOR
Hans Wollner.
BY
Harness, Dickey & Pierce.
ATTORNEYS.

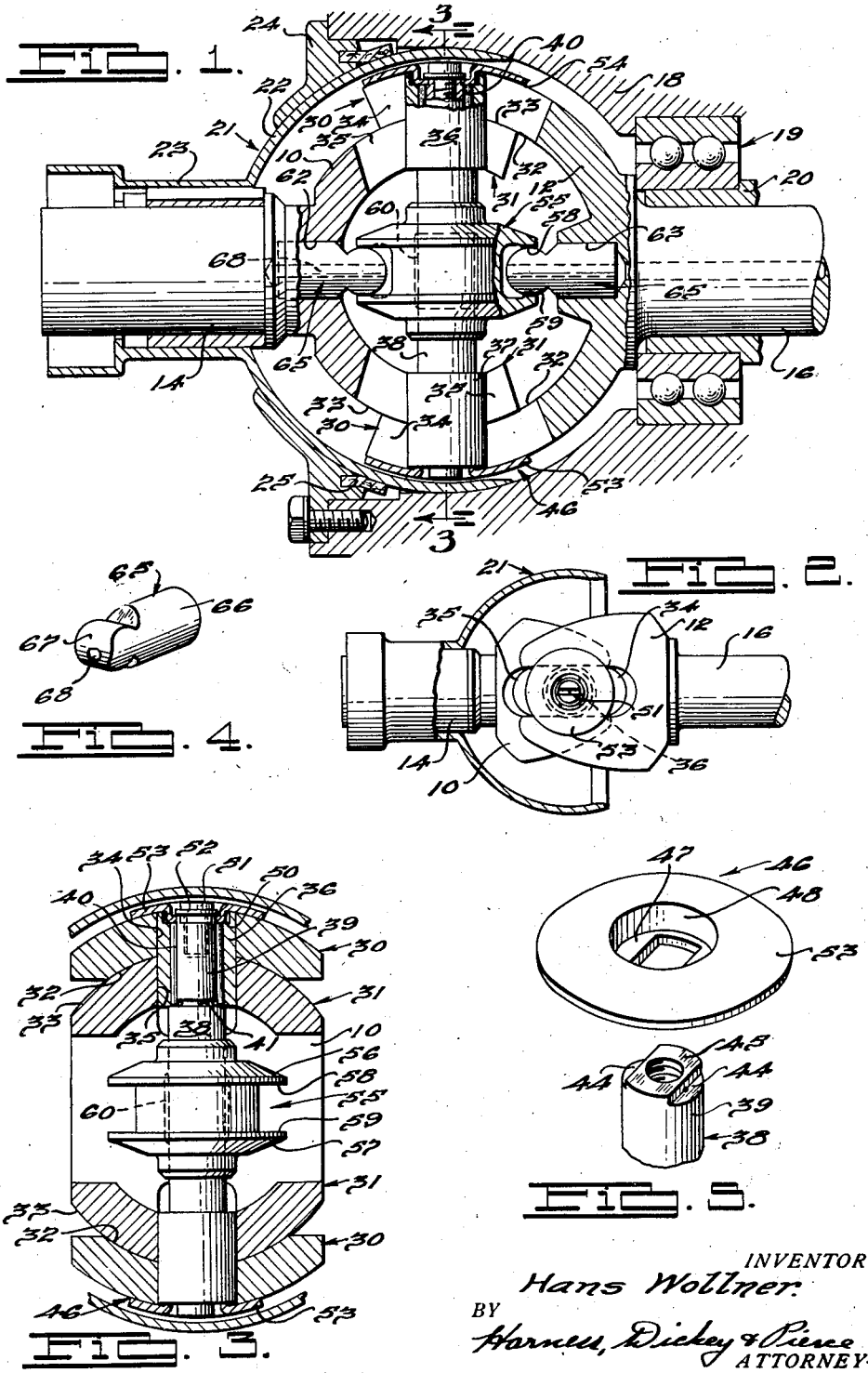

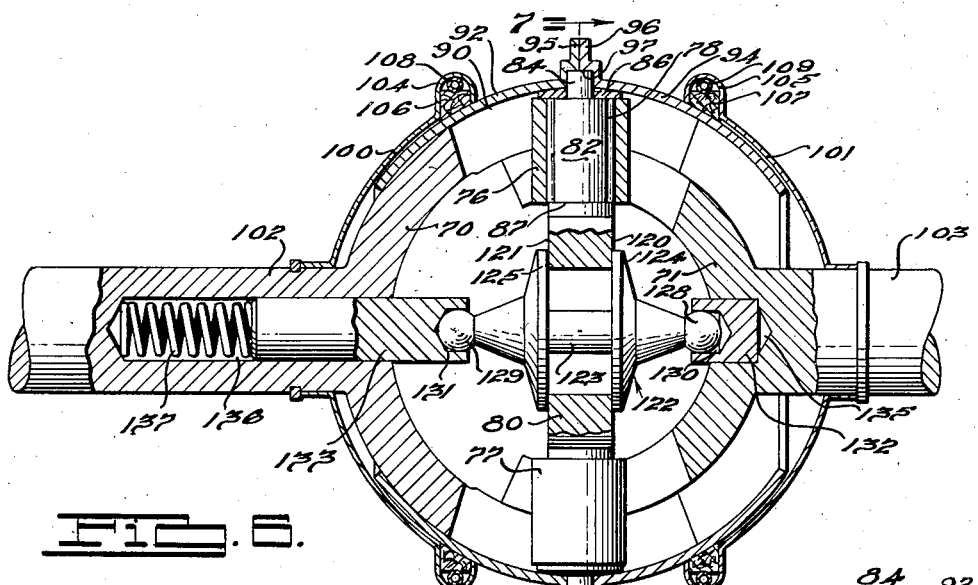

Patented Mar. 11, 1941

2,234,296

UNITED STATES PATENT OFFICE 2,234,296

CONSTANT VELOCITY UNIVERSAL JOINT

Hans Wollner, Detroit, Mich., assignor to Universal Products Co., Inc., Dearborn, Mich., a corporation of Delaware Application July 1, 1937, Serial No. 151,473

15 Claims. (Cl. 64—21)

The present invention relates to a constant velocity universal joint, i. e., a joint wherein the speed of the driven member is at all times exactly equal to the speed of the driving member.

It is an object of the present invention to provide a relatively small compact constant velocity joint having a few parts, which are inexpensive to manufacture, and easy to assemble.

Another object of the invention is to provide an improved, simplified and effective means for centering the trunnion member of a constant velocity joint.

Another object of the invention is to provide improved means for maintaining the axis of the driving trunnion at equal angles with respect to the driving and driven members of the universal joint as the latter oscillate with respect to each other during normal operation.

Another object of the invention is to provide an improved sealing housing for a universal joint.

Other objects, which include, the provision of an improved design and arrangement of the various details of the construction will become apparent from the following specification, the accompanying drawings, and the appended claims.

In the drawings:

Figure 1 is a longitudinal sectional view showing one form of the contant velocity universal joint.

Fig. 2 is a plan view of the joint, parts being broken away, to illustrate the construction.

Fig. 3 is a transverse sectional view taken on the line 3—3 of Fig. 1.

Fig. 4 is a perspective view of one of the details of construction.

Fig. 5 is an exploded view showing the relation of the centering stamping and the torque transmitting pin or trunnion.

Fig. 6 is a longitudinal sectional view of a modified form of the invention.

Fig. 7 is a sectional view taken on the line 7—7 of Fig. 6.

Fig. 8 is a sectional view taken on the line 8—8 of Fig. 7.

Fig. 9 is a sectional view taken on the line 9—9 of Fig. 6.

Fig. 10 is a longitudinal sectional view of a further modification of the constant velocity joint.

Fig. 11 is a section taken on the line 11—11 of Fig. 10.

Fig. 12 is an exploded view of the main joint members shown in Figs. 10 and 11 with the members partly in section on the line 12—12 of Fig. 11.

The form of the invention shown in Figs. 1 to 5, inclusive, is particularly adapted for use in locations where there already exists a suitable housing for the joint. Referring particularly to Fig. 1, it will be seen that the joint itself comprises a pair of universally connected members 10 and 12 having integral axially extending shanks 14 and 16, respectively. These members comprise the principal torque transmitting members of the joint and either one may drive the other.

For purposes of illustration the joint is shown as mounted in a housing member 18 which may form, for example, the pivotally mounted wheel supporting housing of a power driven vehicle steering wheel, such as those found on front wheel drive automobiles. Member 18 carries a bearing indicated generally at 19 which supports and journals the shank 16 of member 12. If desired, a sleeve member indicated fragmentarily at 20 may be positioned between bearing 19 and shank 16, and this sleeve may carry the vehicle wheel. Housing member 18 is generally spherical in internal configuration, and is open at its left end as viewed in Fig. 1. This open end is closed by a member 21 having a spherical portion 22 fitting the internal surface of member 18 and having a cylindrical portion 23 journaled upon shank 14 of member 10. A partially spherical annular plate 24 is bolted or otherwise secured to housing member 18, and serves to hold the housing member 21 against removal from housing member 18. A packing ring 25 of felt or the like is carried by annular plate 24, and bears against member 18 to seal the joint.

The arrangement of the housing members 18, 21 and 24 forms no part of the present invention and any suitable housing may be utilized with the hereinafter described universal joint.

The joint itself comprises the aforementioned members 10 and 12, which are provided with diametrically opposed arms having interengaging spherical surfaces. The member 12 has a pair of arms indicated generally at 30 while the member 10 has a similar pair of arms 31. The arms 30 and 31 have interengaging internal and external spherical surfaces 32 and 33, respectively, which form a universal or ball and socket connection between the members. The width of the arms 30 and 31 measured circumferentially is such that the members 10 and 12 may be assembled in the position shown in Figs. 1 and 3 by inserting member 10 into the member 12 when the arms 30 and 31 of these members are displaced at 90° from the position shown in Fig. 3. The members are then rotated into the relative position shown in Figs. 1 and 3 in which the internal and external spherical surfaces interengage and universally connect the members.

The arms 30 are provided with diametrically opposed slots 34 extending in a plane containing the axis of the joint member 12 and the arms 31 are provided with similar slots 35 extending in a plane containing the axis of joint member 10. The driving torque is transmitted between members 10 and 12 by means of a pair of sleeve members 36 and 37 each of which extends through and fits in adjacent slots 34 and 35 in the arms of members 10 and 12 as best shown in Figs. 1 and 3. A pin or trunnion member 38 having reduced end portions 39 extends through both of the sleeves 36 and 37 to maintain them in axial alignment, and suitable anti-friction rollers 40 of the so-called needle or quill type are provided between the sleeves, and the trunnion or pin 38. The inner ends of the sleeves and rollers seat against the shoulders 41 on the pin 38. These sleeves and pin or trunnion form a pivotal connection between the members 10 and 12 which will permit relative pivotal movement in two planes at right angles, the sides of the slots 34 and 35 rolling or sliding upon the sleeves incident to this movement.

In order to produce a universal driving relation between the members 10 and 12 it is essential that the common axes of sleeves 36 and 37 extend at all times through the common center of spherical surfaces 32 and 33, and in accordance with the present invention there is provided an improved and simplified mechanism for this purpose. Referring particularly to Figs. 1, 3 and 5 of the drawings it will be seen that the end of the trunnion or pin 38 is provided with a pair of diametrically opposed recessed shoulders 44 forming a reduced end projection 45 having parallel sides. The end projection 45 extends through a correspondingly shaped opening in the bottom wall 47 of a cup shaped stamping 46, shown best in Fig. 5. The cylindrical wall 48 of this stamping fits within an annular recess 50 in the outer end of one of the sleeves 36 or 37 when the parts are assembled and the stamping 46 is held in position by a machine screw 51 cooperating with a lock washer 52. The stamping 46 is provided with a relatively wide peripheral flange 53 which is generally spherical in contour and which fits and seats upon a correspondingly curved external spherical surface 54 on one of the arms of joint member 12. This spherical surface 54 is concentric with surfaces 32 and 33. The bottom 47 of the cup shaped stamping 46 engages the ends of rollers 40 and also the sleeve 36 to hold the sleeve and rollers against displacement. In addition the flanges 53 of stamping 46 engages the spherical outer surface of joint member 12 for the purpose of centering the axis of the pin and sleeves. Since the construction is identical at both ends of the pin 38, it is apparent that the stampings 46 maintain the axis of the pin 38 and sleeves 36 and 37 in a line extending through the center of the joint at all times. It should be observed that this centering function is performed entirely independently of the joint housing, and by the simple cap stamping that holds the sleeves and rollers in position.

In order to insure that the speed of the driven member of the universal joint will at all times be exactly equal to the speed of the driving member, as is necessary in all joints of the so-called constant velocity type, it is essential that means be provided for maintaining the common axis of the pin 38 and sleeves 36 and 37 at equal angles with respect to the axis of joint members 10 and 12 at all times during relative oscillation of members 10 and 12 about the center of the joint during normal operation. Accordingly, in accordance with the present invention, there is provided an improved and simplified mechanism for this purpose. This mechanism comprises a spool indicated generally at 55, which is slidably mounted upon the pin 38, and which is provided with spaced radially extending flanges 56 and 57 having flat annular radially extending inner surfaces 58 and 59, respectively. This spool 55 is freely slidable and rotatable upon the pin 38, and is preferably formed as an integral part. The axial bore in spool 55, through which pin 38 extends, is preferably relieved intermediate its ends, as indicated in dotted lines at 60 in Figs. 1 and 3, in order to reduce the length of the bearing surfaces between the pin and the spool.

The main joint members 10 and 12 are provided respectively with a pair of axially extending bores 62 and 63 in each of which is mounted an element 65, the form of which is best shown in Fig. 4. These elements 65, which are identical, are each provided with a cylindrical shank 66 which is press-fitted into one of the bores 62 or 63, and the element is also provided with a cylindrical end portion 67, the axis of which extends at right angles to the axis of the shank 66. The diameter of the cylindrical portions 67 on element 65 is equal to the axial spacing between the annular surfaces 58 and 59 on the spool flanges, and the length of the elements is such that the cylindrical portions 67 engage between these annular surfaces 58 and 59 when the parts are assembled. The elements 65 are provided with axial bores 68 to prevent an air pressure building up in bores 62 and 63 when the elements are pressed into position.

The structure just described positively maintains the axis of pin 38, and therefore the common axis of sleeves 36 and 37, at equal angles with respect to the axes of the main joint members 10 and 12 at all times by reason of the fact that it shifts the axis of pin 38 by an angle equal to one-half of the angle through which the axes of joint members 10 and 12 move relative to each other about a central axis perpendicular to the plane of Fig. 1, of the drawings. This shifting of the axis of pin 38 is accompanied by a sliding movement of spool 55 on the pin and by slight inward and outward movement of the cylindrical portions 67 of elements 65 relative to the annular surfaces 58 and 59 on the spool flanges. However, since the cap stampings 46 on the ends of the pin maintain the axis of the pin extending in a line through the center of the joint, the inward and outward movement of the two elements 65 relative to the annular surfaces 58 and 59 will at all times be equal. Accordingly, the construction effects a perfect constant velocity torque transmission.

It is apparent from the above that there is provided in accordance with this form of the invention an exceedingly compact, rugged, and simple constant velocity joint. This joint is formed of relatively few simple parts which may be readily assembled in the following manner. The elements 65 are press-fitted into the bores 62 and 63 of the main joint members 10 and 12 prior to assembly of the members 10 and 12 into the relationship shown in the drawings. Following assembly of members 10 and 12, the spool member 55 is inserted in a direction perpendicular to the plane of Fig. 1 into the position shown, and the pin 38 is inserted through the slots 34 and 35 and through the central bore of spool 55. If desired, one of the sleeves 36 or 37 and the associated anti-friction rollers 40 and centering cap 46 may be fixed in position upon the pin 38 prior to its insertion through the slots, and through the bore in spool 55. Thereafter, the sleeve, rollers, and cap 46 may be positioned upon the opposite end of the pin 38 to complete the assembly.

In Figs. 6 to 8 of the drawings there is shown a modified form of the joint wherein the joint itself is provided with a sealing housing. In this joint the main joint members 70 and 71 are substantially identical to the joint members 10 and 12 previously described, and the joint is provided with torque transmitting sleeves 76 and 77 containing so-called needle or quill anti-friction rollers 78 in the manner described in connection with the modification shown in Figs. 1 to 5 inclusive. In this form of the invention, however, the trunnion member is formed, as best shown in Fig. 7, as an annular ring 80 having a pair of diametrically opposed radially extending trunnions 82, which cooperate with the sleeves 76 and 77, and the rollers 78. The outer ends of the trunnions 82 are provided with reduced projections 84 forming shoulders 85 upon which are seated rings or washers 86 for holding the sleeves and rollers in position upon the trunnions. These washers are preferably provided with spherical upper surfaces, as shown. The inner ends of the sleeves and rollers bear against the shoulder 87 at the inner ends of the trunnions. The outer surface of the main joint member 70 is provided with an external spherical surface 90 concentric with the center of the joint, and upon which is seated an annular split housing member formed of two parts 92 and 94, having confronting flanges 95 and 96 secured together in any suitable manner, as by bolts 97. The flanges 95 and 96 are formed to define a pair of recesses 97 for the reception of the reduced ends 84 of the trunnions 82. The reduced end projections 84 and the recesses 97 are preferably provided with flat sides, as shown best in Fig. 9 of the drawings, in order to prevent relative rotation between the annular housing ring and the trunnions, for a purpose to be set forth hereinafter.

It will be observed that the annular housing ring formed of members 92 and 94 performs the essential function of maintaining the common axis of the trunnions 82 in a line extending through the center of the joint by reason of the fact that the annular housing members 92 and 94 are secured to the trunnions and seat upon a spherical surface concentric with the center of the joint. In addition, the housing members 92 and 94 cooperate with a pair of spherical housing members 100 and 101 fixedly mounted respectively on the shanks 102 and 103 of the main joint members 70 and 71 to house and seal the joint. The housing members 100 and 101 are provided with peripheral channels 104 and 105 in which are positioned annular packing rings 106 and 107, which are urged into engagement with the annular housing rings 92 and 94 by means of annular coil springs 108 and 109. It is apparent therefore that the housing members 92, 94, 100, 101 and associated sealing rings completely seal the entire joint and thereby serve as an effective means for retaining lubricant and preventing the entrance of dirt or foreign matter.

One of the features of this form of the joint resides in the provision of means to prevent relative rotation between the trunnions 82 and the annular housing 92—94. This means operates, as will appear hereinafter, to prevent movement of the central plane of the annular housing ring out of the plane of the annular trunnion ring 80. It is for this reason that the projections 84 and the recesses 97 in the annular housing ring flanges 95 and 96 are formed with flat sides. It is preferred, however, to provide additional means for this purpose, and such additional means are shown in Fig. 7. Referring to Fig. 7, it will be seen that the annular ring 80 is provided with two openings or bores 110 and 112 extending at right angles of the axes of trunnions 82 and in the plane of the ring 80. Pressed into these bores 110 and 112 are a pair of pins 113 having flattened end portions 115, which project into suitable recesses 116 and 117 formed by the flanges 95 and 96 of the annular housing ring 92—94. These pins 113 positively prevent any rotation of the trunnion ring 80 relative to the pin of the annular housing ring 92—94, and hence maintains the trunnion ring in the central transverse plane of the housing ring 92—94.

It is preferable, for reasons which will become apparent, to provide a different form of mechanism for maintaining the common axis of trunnions 82 at equal angles with respect to the axes of the main joint members 70 and 71 in the form of the universal joint shown in Figs. 6, 7 and 8 than that illustrated in connection with the joint shown in Figs. 1–5 inclusive. This function is performed, in the form of the invention shown in Figs. 6 to 8, by the following structure. The opposite sides of the trunnion rings 80 are provided with parallel flat surfaces 120 and 121 extending parallel to the plane of the ring 80, and there is provided a spool member indicated generally at 122 having a shank 123 extending through the opening in the trunnion ring 80. The spool 122 is provided with spaced radially extending flanges 124 and 125 having flat inner surfaces in engagement with the flat surfaces 120 and 121 at the opposite sides of the ring 80. The spacing of the flanges 124 and 125 is sufficient to maintain the inner surfaces thereof in engagement at all times with the flat surfaces 120 and 121, while permitting free movement of the shank 123 of the spool within the larger central opening of the trunnion 80. Preferably, the spool member 122 is formed as an integral part, and accordingly there is provided a slot 126 in the ring 80 shown best in Fig. 7, through which the shank of the spool 122 may be inserted when the joint is assembled.

The ends of the spool are provided with a pair of balls 128 and 129, which are adapted to cooperate with sockets 130 and 131 in a pair of elements 132 and 133 carried respectively by the main joint members 71 and 70. The element 132 is press-fitted into a suitable recess 135 into the main joint member 71, while the element 133 is slidably fitted with an elongated cylindrical recess 136 of the main joint member 70. In order to permit assembly of the spool member in the joint there is provided a coil spring 137 in the recesses 136, which bears against the element 133 and normally forces it outwardly of the cylindrical recess. When the spool member is assembled in the joint the element 133 is forced against the pressure of spring 37 into the recess 136 in order to provide clearance for the ball 129 as it is inserted within the joint mechanism. When the ball 129 is in alignment with a socket 131 of element 133, the element 133 may be released whereupon it will be advanced by spring 137 into the position shown in Fig. 7.

The structure just described positively and accurately shifts the axes of trunnions 82 through an angle equal to one-half the angle of the relative movement between the joint members 70 and 71 measured about a central axis perpendicular to the plane of Fig. 6, and thus insures a perfect constant velocity torque transmission. During the shifting movements of the trunnion member 80 by this mechanism the spool member 122 will slide relative to the trunnion ring 80, but the axis of the spool will always remain parallel to the axis of the trunnion ring. There will also be a slight movement of the ball 128 inwardly and outwardly of the socket 130 in element 132, and an exactly equal movement of the element 133 inward and outward of its socket 137. This follows from the fact that the annular housing ring 92—94 maintains the axis of the trunnion in a line extending through the center of the joint.

Aside from the fact that the above described structure gives rise to the constant velocity characteristics of the joint, it has a further function, in that it also maintains the central transverse plane of the housing ring 92—94 at equal angles with respect to the axes of the main joint members 70 and 71. This follows from the fact that the mechanism not only controls the alignment of the trunnion axis, but also controls the plane of the trunnion ring 80, and consequently the plane of the housing ring 92—94 which is attached thereto. The advantage of this arrangement is that the intermediate housing rings 92 and 94 will always shift in any direction through an angle equal to one-half of the angle by which the axis of relation of the main joint member shifts with respect to the axis of the other main joint member. Accordingly, it is possible to very materially reduce the amount of overlap between the central annular housing members 92 and 94 and the housing members 100 and 101, which cooperate therewith to seal the joint.

The form of joint just described may be assembled in the following manner. The torque transmitting members 70 and 71 are assembled to the relative positions shown in Figs. 6 and 7 in the manner described in connection with the form of joint shown in Figs. 1-5. The trunnion member 80 with assembled sleeves 76 and 77 and needles 78 is then inserted through the slots in members 70 and 71. To accomplish this, it is necessary to rotate the trunnion ring 80 into the plane of the slots. Thereafter, the ring is rotated to the position shown, the pins 113 are inserted in the apertures 110 and 112 and the housing rings 92 and 94 are assembled in position.

Where, as in the case of front wheel drive units for motor vehicles, it is essential to provide universal joints of small size and great strength, it may be desirable to change the form of the torque transmitting members in the manner shown in Figs. 10, 11 and 12. In the universal joint illustrated in the latter figures, the torque transmitting elements 120 and 121, which are carried respectively by hubs 122 and 123, are provided with slots 126 and 127 like those described in previous embodiments of the invention, but the slotted jaws of each element are connected to each other throughout their lengths, thus providing a pair of continuous, partly spherical elements. As best shown in Fig. 11, the element 120 is almost a complete sphere having a continuous annular transverse section. The inner element 121 is similar except that it is provided with flattened opposite sides 130 and 131 for a purpose to be described. It is apparent that torque transmitting elements which are continuously annular in transverse section are of substantially greater strength and rigidity than the spaced separate jaw type shown in Figs. 1-9 inclusive.

The torque transmitting element 120 is substantially spherical in internal configuration except that at opposite sides of the plane of slots 126 the open end of the element 120 is provided with a cut away area 132 of cylindrical contour, as best shown in Fig. 12, in order to provide clearance for assembly of the elements 120 and 121. The element 121 is assembled with respect to element 120 by first rotating the members relatively through 90° from their normal position, whereupon they may be telescoped together. The cut away area 130 provides clearance for the slotted spherical portions of element 121 and the flats 130 and 131 on element 121 provide clearance for the slotted spherical portions of element 120 as the element 121 is inserted within element 120. After the torque transmitting elements 120 and 121 are telescoped together they may be rotated relatively into the position shown in Figs. 10 to 12, inclusive.

In this form of joint it is impossible to utilize the type of bisecting device shown in Figs. 6 and 7 inasmuch as there is no opening through which the spool 122 can be inserted after the torque transmitting elements are assembled and the spool cannot be placed in position on trunnion ring 80 until after the torque transmitting elements 70 and 71 are assembled with the torque ring. Accordingly, the form of torque transmitting elements shown in Figs. 10-12 inclusive must be used in connection with the type of bisecting spool shown in Figs. 1-5 inclusive, which can be placed loosely within torque transmitting element 121 prior to its insertion within element 120. Thereafter the trunnion 135 can be inserted through slots 126 and 127 and through the spool, indicated at 136.

The form of torque transmitting elements shown in Figs. 10 to 12 are particularly adapted for use in connection with trunnion caps of the type shown in Figs. 1-5 inclusive, for maintaining the axis of the trunnion in the center of the joint. However, they may also be utilized in conjunction with the annular sealing ring type of centering device shown in Figs. 6 to 8, and this latter form is shown in Figs. 10-12 for purpose of illustration. The trunnion 135 is secured to the two-piece annular sealing ring 137, 138 in the manner shown in Figs. 6 to 8. The sealing housing is completed by means of a pair of partly spherical housing members 139 and 140, each of which carries a sealing ring 141 and a spring 142. The housing member 140 is fixed to an annular projection 145 on hub 123 in any desired manner, as by a spinning operation. Projection 145 may serve as part of an axial thrust bearing.

The bisecting spool 136 cooperates with a pair of elements 150 and 151 which are similar to the elements 65 shown in Figs. 1 and 4 except that they are provided with shoulders 152 and 153, respectively, for locating the elements with respect to spool 136. For reasons which will appear, element 151 is press fitted into its opening 154 while element 150 has a slip fit in its opening 155.

One of the outstanding features of the joint just described is its small size. In the past, one of the difficulties that has prevented the construction of small, compact constant velocity joints has been the difficulty of assembling them with a bisecting device located interiorly of the joint. The present joint, however, is so constructed that in spite of its small size and the fact that the bisecting device is entirely enclosed, it may be readily assembled in the following manner. Element 151 is pressed into opening 154 of member 121 in the relative position shown in Fig. 10 and element 150 is inserted in opening 155 of member 120, with the axis of the outer cylindrical portion of element 150 extending substantially in the plane of slots 126 of member 120, in which position the axis of the outer cylindrical portion of element 150 is displaced through an angle of 90° from the final position shown in Fig. 10. Thereafter, the bisecting spool 136 is placed within joint member 121 and in engagement with element 151, as shown in Fig. 10, and the joint member 121 is advanced into joint member 120. As previously indicated, joint member 121 is inserted into member 120 while displaced relative thereto by an angle of 90 degrees. Accordingly, during this insertion of member 121 into member 120, the spaced flanges on spool 136 can embrace element 150 which is also displaced by 90° from its final position. Thereafter joint members 120 and 121 are rotated relative to each other through an angle of 90° into the position shown in Fig. 10. During this relative rotation, element 151 cannot rotate in opening 154 and accordingly element 150 will be rotated into its final position wherein the axis of the outer cylindrical portion which is engaged between the spool flanges extends perpendicular to the plane of slots 126. There is sufficient friction between element 150 and the opening 155 to maintain the element against longitudinal sliding movement in the opening after the parts are assembled. However, shoulder 152 positively prevents inward movement of the element and the shank of spool 136 will limit outward movement to an immaterial amount. The assembly is completed by inserting trunnion 135 through the slots in members 120 and 121 and the opening in spool 136, and by assembling the sleeves, the rollers, and the housings 137—138 on the trunnion.

It should be noted that the bisecting elements 65 in the form of invention shown in Figs. 1-5, inclusive, and the corresponding elements 150 and 151 in modification shown in Figs. 10-12, inclusive, would be operative if their outer ends which engage with the spool flanges were spherical instead of cylindrical in form. In that event, both of the elements 150 and 151 could be press fitted in the joint members 120 and 121 without interfering materially with assembly of the joint. However, these elements are preferably formed with cylindrical end portions, the axes of which extend perpendicular to the plane of the slots in the joint members, inasmuch as this provides a line bearing contact between the outer members of the elements and the spool flanges. A line bearing contact at this point is highly desirable as the loads sustained at this point are, under certain circumstances, quite large. If any flattening of the elements occurred due to this load, it would give rise to backlash which would destroy the pure constant velocity characteristics of the joint, and create noise.

It will be observed that in accordance with the present invention there are provided three novel forms of constant velocity joints which are exceedingly rugged, simple and compact in their construction, and which embody a number of important features of advantage, among these the fact that the trunnions are centered by means carried by the outer ends of the trunnions and engaging a spherical surface of one of the joint members. Another important feature is the fact that the trunnions are provided with bearing surfaces containing anti-friction roller bearings of the needle or quill type. By reason of this latter feature, the amount of sliding friction in the joint is negligible, and yet the loads which may be transmitted safely are exceedingly high.

While only three forms of the invention have been shown and described, it is apparent that other modifications are available within the spirit of the specification, the drawings, and in the appended claims.

What is claimed is:

1. In a constant velocity universal joint, external and internal members having interengaging internal and external spherical surface portions, respectively, for universally connecting the members together, a trunnion element forming the driving connection between said members, the external member also having an external spherical surface concentric with the center of the joint, means connected to the trunnion and engaging said last mentioned external spherical surface for maintaining the axis of the trunnion in a line extending through the center of the joint, and means for maintaining the angles between the axis of the trunnion and the axes of said members equal to each other as the members oscillate with respect to each other about the center of the joint.

2. In a constant velocity universal joint, inner and outer members having external and internal spherical surfaces, respectively, in engagement and concentric with each other, slots in each of said members extending respectively in planes containing the axes of the respective members, the outer of said members having external spherical surface portions adjacent said slots and concentric with said first mentioned spherical surfaces, a trunnion element extending through the slots in both members, a bearing sleeve journaled on said trunnion adjacent each end thereof and located in said slots, and a retaining cap for each bearing sleeve secured to the end of each trunnion and extending outwardly over the external spherical portion of said outer member, said caps having internal spherical surface portions for maintaining the mid point in the axis of said trunnion at the center of said joint, and means for maintaining the angles between the axis of said trunnion and the axes of said members equal to each other during oscillation of the members relative to each other.

3. In a constant velocity universal joint, a driving and a driven member each having slots extending respectively in planes containing the axes of the members, a bearing sleeve extending through slots in both of said members to form a driving connection therebetween, a trunnion journaled in said sleeve, one of said members having an external spherical surface adjacent the slot through which said sleeve extends, means for maintaining the axis of said trunnion in a line extending through the center of said spherical surface including a cap element fixedly secured to the end of the trunnion and having a marginal portion projecting radially beyond said sleeve and engaging said spherical surface, said cap comprising a sheet metal stamping having a depressed central portion extending into the end of said sleeve, and the means for securing said stamping to said trunnion comprising a retaining screw having its head located within said depression, and means for maintaining the angles between the axis of the trunnion and the axes of said members equal to each other as the members oscillate with respect to each other about the center of the joint.

4. In a constant velocity universal joint, driving and driven members connected together for relative universal movement, a trunnion forming the driving connection between said members, a sleeve member slidable upon said trunnion and having a pair of axially spaced radially extending flanges, and means carried by each of said members and extending into the space between said flanges at opposite sides of said sleeve, respectively, for maintaining the angles between the axis of said trunnion and the axes of said members equal to each other during oscillation of said members relative to each other about the center of the joint, said members each having an axially extending opening formed therein, and said means comprising a pair of elements each having a shank portion fitted in one of said openings and having a terminal portion of cylindrical contour fitting into the space between said sleeve flanges, the axes of said cylindrical terminal portions extending transversely to the axes of the respective members.

5. In a constant velocity universal joint, driving and driven members connected together for relative universal movement, a trunnion forming the sole driving connection between said members, a sleeve member slidable upon said trunnion and having a pair of axially spaced radially extending flanges, and means carried by each of said members and extending into the space between said flanges at opposite sides of said sleeve, respectively, for maintaining the angles between the axis of said trunnion and the axes of said members equal to each other during oscillation of said members relative to each other about the center of the joint, said members each having an axially extending cylindrical opening formed therein, and said means comprising a pair of elements each having a cylindrical shank portion fitted in one of said openings and having a terminal portion of cylindrical contour fitting into the space between said sleeve flanges, the axes of said cylindrical terminal portions extending transversely to the axes of the respective cylindrical shank portions.

6. In a constant velocity universal joint, driving and driven members, means including a trunnion forming a driving connection between said members, a sleeve member slidable upon said trunnion and having a pair of axially spaced radially extending flanges, and means carried by each of said members and extending into the space between said flanges at opposite sides of said sleeve, respectively, for maintaining the angles between the axis of said trunnion and the axes of said members equal to each other during oscillation of said members relative to each other about the center of the joint, said members each having an axially extending opening formed therein, and said means comprising a pair of elements each having a shank portion fitted in one of said openings and having a terminal portion of cylindrical contour fitting into the space between said sleeve flanges, the axes of said cylindrical terminal portions extending transversely to the axes of the respective members.

7. In a constant velocity universal joint, driving and driven members, means including a trunnion forming a driving connection between said members, a sleeve member slidable upon said trunnion and having a pair of axially spaced radially extending flanges, and means carried by each of said members and extending into the space between said flanges at opposite sides of said sleeve, respectively, for maintaining the angles between the axis of said trunnion and the axes of said members equal to each other during oscillation of said members relative to each other about the center of the joint, said members each having an axially extending cylindrical opening formed therein, and said means comprising a pair of elements each having a cylindrical shank portion fitted in one of said openings and having a terminal portion of cylindrical contour fitting into the space between said sleeve flanges, the axes of said cylindrical terminal portions extending transversely to the axes of the respective cylindrical shank portions.

8. In a constant velocity universal joint, driving and driven members, a trunnion element adapted to transmit a driving torque from one of said members to the other, one of said members having a spherical surface portion concentric with the center of said joint, means engageable with said spherical surface portion for maintaining the mid point in the axis of said trunnion at the center of the joint, a sleeve element slidably mounted upon said trunnion and having spaced radially extending flanges, and means carried by said members and extending into the space between said sleeve flanges for maintaining the angles between the axis of said trunnion and the axes of said members equal to each other as the members oscillate with respect to each other about the center of the joint.

9. In a constant velocity universal joint, driving and driven members, a trunnion element adapted to transmit a driving torque from one of said members to the other, one of said members having an external spherical surface portion concentric with the center of said joint, a segmental spherical cap element secured to each end of said trunnion element, said cap elements engaging diametrically opposed portions of said spherical portion of said member for maintaining the mid point in the axis of said trunnion at the center of the joint, a sleeve element slidably mounted upon said trunnion and having spaced radially extending flanges, and means carried by said members and extending into the space between said sleeve flanges for maintaining the angles between the axis of said trunnion and the axes of said members equal to each other as the members oscillate with respect to each other about the center of the joint.

10. In a constant velocity universal joint, external and internal members having interengaging internal and external spherical surface portions respectively, for universally connecting the members together, a trunnion element forming the driving connection between said members, means for maintaining the angles between the axes of said trunnion and the axes of said members equal to each other during relative oscillation of said members about the center of the joint, the external member also having an external spherical surface concentric with the center of the joint and an annular segmental spherical band fitting said last mentioned external spherical surface, said band being secured to said trunnion at the ends thereof whereby it maintains the mid point in the axis of the trunnion at the center of the joint.

11. In a constant velocity universal joint, inner and outer torque transmitting members having interengaging external and internal spherical surfaces, respectively, for universally connecting the members together, a trunnion element forming a driving connection between the members, the outer member having external spherical surface portions concentric with the center of the joint, an annular segmental spherical band surrounding said joint and fitting said last mentioned spherical surface portions, said band being fixedly secured to said trunnion with the axis of the trunnion in the central plane of the band whereby the mid point in the axis of the trunnion is maintained in the center of the joint, a pair of housing elements each fixed with respect to one of said members and having an overlapping sealing engagement with said band, and means for maintaining the central plane of said band at equal angles with respect to the axes of said members.

12. In a constant velocity universal joint, inner and outer torque transmitting members having interengaging external and internal spherical surfaces, respectively, for universally connecting the members together, slots diametrically opposed in each of said members lying in planes containing the axes of the respective members, a trunnion element extending through the slots in both members and forming a driving connection between the members, the outer member having external spherical surface portions concentric with the center of the joint, an annular segmental spherical band surrounding said joint and fitting said last mentioned spherical surface portions, said band being fixedly secured to said trunnion with the axis of the trunnion in the central plane of the band whereby the mid point in the axis of the trunnion is maintained in the center of the joint, a pair of housing elements each fixed with respect to one of said members and having an overlapping sealing engagement with said band, and means for maintaining the central plane of said band at equal angles with respect to the axes of said members.

13. In a constant velocity universal joint, driving and driven members, a trunnion element forming a driving connection between said members, said trunnion element having an arm projecting at right angles thereto, an annular segmental spherical band surrounding said joint and secured to one end of the trunnion and to the end of the arm with the trunnion and arm positioned substantially in the plane of the band, a pair of housing elements each secured to one of said members and having an overlapping sealing engagement with said band, and means for maintaining the central plane of said band at equal angles with respect to the axes of said members.

14. In a constant velocity universal joint, driving and driven members, a trunnion element forming a driving connection between said members, said trunnion element having a pair of arms projecting in opposite directions therefrom, an annular segmental spherical band surrounding said joint and secured to the ends of the trunnion and to the ends of the arms, with the trunnion and arms positioned in the central plane of the band, a pair of housing elements each secured to one of said members and having an overlapping sealing engagement with said band, and means for maintaining the central plane of said band at equal angles with respect to the axes of said members.

15. In a constant velocity universal joint, a pair of members having internal and external concentric spherical surfaces, respectively, said spherical surfaces being in engagement with each other for universally connecting the members, slots extending through said members in proximity to said spherical surfaces, the slots in each member extending in a plane containing the axis of that member, a sleeve extending through slots in both members, means including a trunnion element extending through said sleeve for maintaining the angles between the axis of said sleeve and the axes of said members equal during relative oscillation of said members about the center of the joint, needle bearings between the sleeve and trunnion, and means carried by said trunnion for retaining said sleeves and needles in position, said means being engageable with a portion of one of said members for maintaining the axis of the sleeve extending in a line through the center of the joint.

HANS WOLLNER.